(12) United States Patent (10) Patent No.: US 12,646,289 B2
Agarwal et al. (45) Date of Patent: Jun. 2, 2026

(54) VISUAL GROUNDING OF SELF-SUPERVISED REPRESENTATIONS FOR MACHINE LEARNING MODELS UTILIZING DIFFERENCE ATTENTION

(71) Applicant: Adobe Inc., San, CA (US)

(72) Inventors: Aishwarya Agarwal, Bengaluru (IN); Srikrishna Karanam, Bangalore (IN); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 314 days.

(21) Appl. No.: 18/336,423

(22) Filed: Jun. 16, 2023

(65) Prior Publication Data

US 2024/0420447 A1 Dec. 19, 2024

(51) Int. Cl.
*G06V 10/75* (2022.01)
*G06V 10/80* (2022.01)

(52) U.S. Cl.
CPC ............ *G06V 10/751* (2022.01); *G06V 10/80* (2022.01)

(58) Field of Classification Search
CPC ....... G06V 10/751; G06V 10/80; G06V 10/82
See application file for complete search history.

(56) References Cited

U.S. PATENT DOCUMENTS

2021/0272258 A1* 9/2021 Sharma ................... G06N 3/088
2024/0255938 A1* 8/2024 Brikis ...................... G06N 3/08
2024/0259668 A1* 8/2024 Li ........................ H04N 23/617

OTHER PUBLICATIONS

Selvaraju, Ramprasaath R., et al. "CASTing Your Model: Learning to Localize Improves Self-Supervised Representations." arXiv preprint arXiv:2012.04630 (2020).https://arxiv.org/abs/2012.04630 (Year: 2020).*
Selvaraju, Ramprasaath R., et al. "Grad-CAM: Visual Explanations from Deep Networks via Gradient-based Localization." arXiv preprint arXiv:1610.02391 (2019).https://arxiv.org/abs/1610.02391 (Year: 2019).*
Zheng, Meng, et al. "Visual similarity attention." arXiv preprint arXiv: 1911.07381 (2019).https://arxiv.org/abs/1911.07381 (Year: 2022).*

(Continued)

*Primary Examiner* — Han Hoang
(74) *Attorney, Agent, or Firm* — Keller Preece PLLC

(57) ABSTRACT

The present disclosure relates to systems, non-transitory computer-readable media, and methods for utilizing difference attention to evaluate and/or train machine learning models. In particular, in some embodiments, the disclosed systems generate, utilizing a machine learning model, a first feature vector from a digital image. In one or more implementations, the disclosed systems generate a masked digital image by masking a region from the digital image. Additionally, in some embodiments, the disclosed systems generate, utilizing the machine learning model, a second feature vector from the masked digital image. Moreover, in some implementations, the disclosed systems determine a difference feature vector between the first feature vector and the second feature vector. Furthermore, in some embodiments, the disclosed systems generate, from the difference feature vector, a difference attention map reflecting a visual grounding of the machine learning model relative to the region.

20 Claims, 11 Drawing Sheets

(56) References Cited

OTHER PUBLICATIONS

Adam Coates and Andrew Y Ng. Learning feature representations with k-means. In Neural networks: Tricks of the trade, pp. 561-580. Springer, 2012.

Aditya Chattopadhay, Anirban Sarkar, Prantik Howlader, and Vineeth N Balasubramanian. Grad-cam++: Generalized gradient-based visual explanations for deep convolutional networks. In 2018 IEEE winter conference on applications of computer vision (WACV), pp. 839-847. IEEE, 2018.

Bolei Zhou, Aditya Khosla, Agata Lapedriza, Aude Oliva, and Antonio Torralba. Learning deep features for discriminative localization. In Proceedings of the IEEE conference on computer vision and pattern recognition, pp. 2921-2929, 2016.

Carsten Rother, Vladimir Kolmogorov, and Andrew Blake. "GrabCut": interactive foreground extraction using iterated graph cuts. ACM transactions on graphics (TOG), 23(3):309-314, 2004.

Chen Wei, Haoqi Fan, Saining Xie, Chao-Yuan Wu, Alan Yuille, and Christoph Feichtenhofer. Masked feature prediction for self-supervised visual pre-training. In Proceedings of the IEEE/CVF Conference on Computer Vision and Pattern Recognition, pp. 14668-14678, 2022.

Deepak Pathak, Philipp Krahenbuhl, Jeff Donahue, Trevor Darrell, and Alexei A Efros. Context encoders: Feature learning by inpainting. In Proceedings of the IEEE conference on computer vision and pattern recognition, pp. 2536-2544, 2016.

Fei Tian, Bin Gao, Qing Cui, Enhong Chen, and Tie-Yan Liu. Learning deep representations for graph clustering. In Proceedings of the AAAI Conference on Artificial Intelligence, vol. 28, 2014.

Haofan Wang, Zifan Wang, Mengnan Du, Fan Yang, Zijian Zhang, Sirui Ding, Piotr Mardziel, and Xia Hu. Score-cam: Score-weighted visual explanations for convolutional neural networks. In Proceedings of the IEEE/CVF conference on computer vision and pattern recognition workshops, pp. 24-25, 2020.

Jianwei Yang, Devi Parikh, and Dhruv Batra. Joint unsupervised learning of deep representations and image clusters. In Proceedings of the IEEE conference on computer vision and pattern recognition, pp. 5147-5156, 2016.

Kai Xiao, Logan Engstrom, Andrew Ilyas, and Aleksander Madry. Noise or signal: The role of image backgrounds in object recognition. arXiv preprint arXiv:2006.09994, 2020.

Kaiming He, Georgia Gkioxari, Piotr Dollar, and Ross Girshick. Mask r-cnn. In Proceedings of the IEEE international conference on computer vision, pp. 2961-2969, 2017.

Kaiming He, Haoqi Fan, Yuxin Wu, Saining Xie, and Ross Girshick. Momentum contrast for unsupervised visual representation learning. In Proceedings of the IEEE/CVF conference on computer vision and pattern recognition, pp. 9729-9738, 2020.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Kaiming He, Xinlei Chen, Saining Xie, Yanghao Li, Piotr Dollar, and Ross Girshick. Masked autoencoders are scalable vision learners. In Proceedings of the IEEE/CVF Conference on Computer Vision and Pattern Recognition, pp. 16000-16009, 2022.

Karan Desai and Justin Johnson. Virtex: Learning visual representations from textual annotations. In Proceedings of the IEEE/CVF conference on computer vision and pattern recognition, pp. 11162-11173, 2021.

Lei Chen, Jianhui Chen, Hossein Hajimirsadeghi, and Greg Mori. Adapting grad-cam for embedding networks. In Proceedings of the IEEE/CVF Winter Conference on Applications of Computer Vision, pp. 2794-2803, 2020.

Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. IEEE transactions on pattern analysis and machine intelligence, 40(4):834-848, 2017.

Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.

M. Everingham, L. Van Gool, C. K. I. Williams, J. Winn, and A. Zisserman. The PASCAL Visual Object Classes Challenge 2007 (VOC2007) Results. http://www.pascal-network.org/challenges/VOC/voc2007/workshop/index.html.

Mark Everingham, SM Eslami, Luc Van Gool, Christopher KI Williams, John Winn, and Andrew Zisserman. The pascal visual object classes challenge: A retrospective. International journal of computer vision, 111(1):98-136, 2015.

Mathilde Caron, Ishan Misra, Julien Mairal, Priya Goyal, Piotr Bojanowski, and Armand Joulin. Unsupervised learning of visual features by contrasting cluster assignments. Advances in Neural Information Processing Systems, 33:9912-9924, 2020.

Mathilde Caron, Piotr Bojanowski, Armand Joulin, and Matthijs Douze. Deep clustering for unsupervised learning of visual features. In Proceedings of the European conference on computer vision (ECCV), pp. 132-149, 2018.

Mathilde Caron, Piotr Bojanowski, Julien Mairal, and Armand Joulin. Unsupervised pre-training of image features on non-curated data. In Proceedings of the IEEE/CVF International Conference on Computer Vision, pp. 2959-2968, 2019.

Mehdi Noroozi and Paolo Favaro. Unsupervised learning of visual representations by solving jigsaw puzzles. In European conference on computer vision, pp. 69-84. Springer, 2016.

Meng Zheng, Srikrishna Karanam, Terrence Chen, Richard J. Radke, and Ziyan Wu. Visual similarity attention. In Proceedings of the Thirty-First International Joint Conference on Artificial Intelligence, IJCAI-22, pp. 1728-1735, 2022.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. International journal of computer vision, 115(3):211-252, 2015.

Peng-Tao Jiang, Chang-Bin Zhang, Qibin Hou, Ming-Ming Cheng, and Yunchao Wei. Layercam: Exploring hierarchical class activation maps for localization. IEEE Transactions on Image Processing, 30:5875-5888, 2021.

Raia Hadsell, Sumit Chopra, and Yann LeCun. Dimensionality reduction by learning an invariant mapping. In 2006 IEEE Computer Society Conference on Computer Vision and Pattern Recognition (CVPR'06), vol. 2, pp. 1735-1742. IEEE, 2006.

Ramprasaath R Selvaraju, Karan Desai, Justin Johnson, and Nikhil Naik. Casting your model: Learning to localize improves self-supervised representations. In Proceedings of the IEEE/CVF Conference on Computer Vision and Pattern Recognition, pp. 11058-11067, 2021.

Ramprasaath R Selvaraju, Michael Cogswell, Abhishek Das, Ramakrishna Vedantam, Devi Parikh, and Dhruv Batra. Grad-cam: Visual explanations from deep networks via gradient-based localization. In Proceedings of the IEEE international conference on computer vision, pp. 618-626, 2017.

Richard Zhang, Phillip Isola, and Alexei A Efros. Split-brain autoencoders: Unsupervised learning by cross-channel prediction. In Proceedings of the IEEE conference on computer vision and pattern recognition, pp. 1058-1067, 2017.

S Ren, K He, R Girshick, and J Sun. Faster r-cnn: Towards real-time object detection with region proposal networks. IEEE Transactions on Pattern Analysis and Machine Intelligence, 39(6):1137-1149, 2016.

Shaoqing Ren, Kaiming He, Ross Girshick, and Jian Sun. Faster r-cnn: Towards real-time object detection with region proposal networks. Advances in neural information processing systems, 28, 2015.

Tam Nguyen, Maximilian Dax, Chaithanya Kumar Mummadi, Nhung Ngo, Thi Hoai Phuong Nguyen, Zhongyu Lou, and Thomas Brox. Deepusps: Deep robust unsupervised saliency prediction via self-supervision. Advances in Neural Information Processing Systems, 32, 2019.

(56) References Cited

OTHER PUBLICATIONS

Ting Chen, Simon Kornblith, Mohammad Norouzi, and Geoffrey Hinton. A simple framework for contrastive learning of visual representations. In International conference on machine learning, pp. 1597-1607. PMLR, 2020.

Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.

Tsung-Yi Lin, Piotr Dollar, Ross Girshick, Kaiming He, Bharath Hariharan, and Serge Belongie. Feature pyramid networks for object detection. In Proceedings of the IEEE conference on computer vision and pattern recognition, pp. 2117-2125, 2017.

Wenqian Liu, Runze Li, Meng Zheng, Srikrishna Karanam, Ziyan Wu, Bir Bhanu, Richard J Radke, and Octavia Camps. Towards visually explaining variational autoencoders. In Proceedings of the IEEE/CVF Conference on Computer Vision and Pattern Recognition, pp. 8642-8651, 2020.

Xinlei Chen and Kaiming He. Exploring simple siamese representation learning. In Proceedings of the IEEE/CVF Conference on Computer Vision and Pattern Recognition, pp. 15750-15758, 2021.

* cited by examiner

Computing Device(s) *900*

Image Editing System *104*

Difference Attention System *102*

Feature Vector Generator *902*

Masking Manager *904*

Difference Attention Manager *906*

Training Manager *908*

Storage Manager *910*

1000

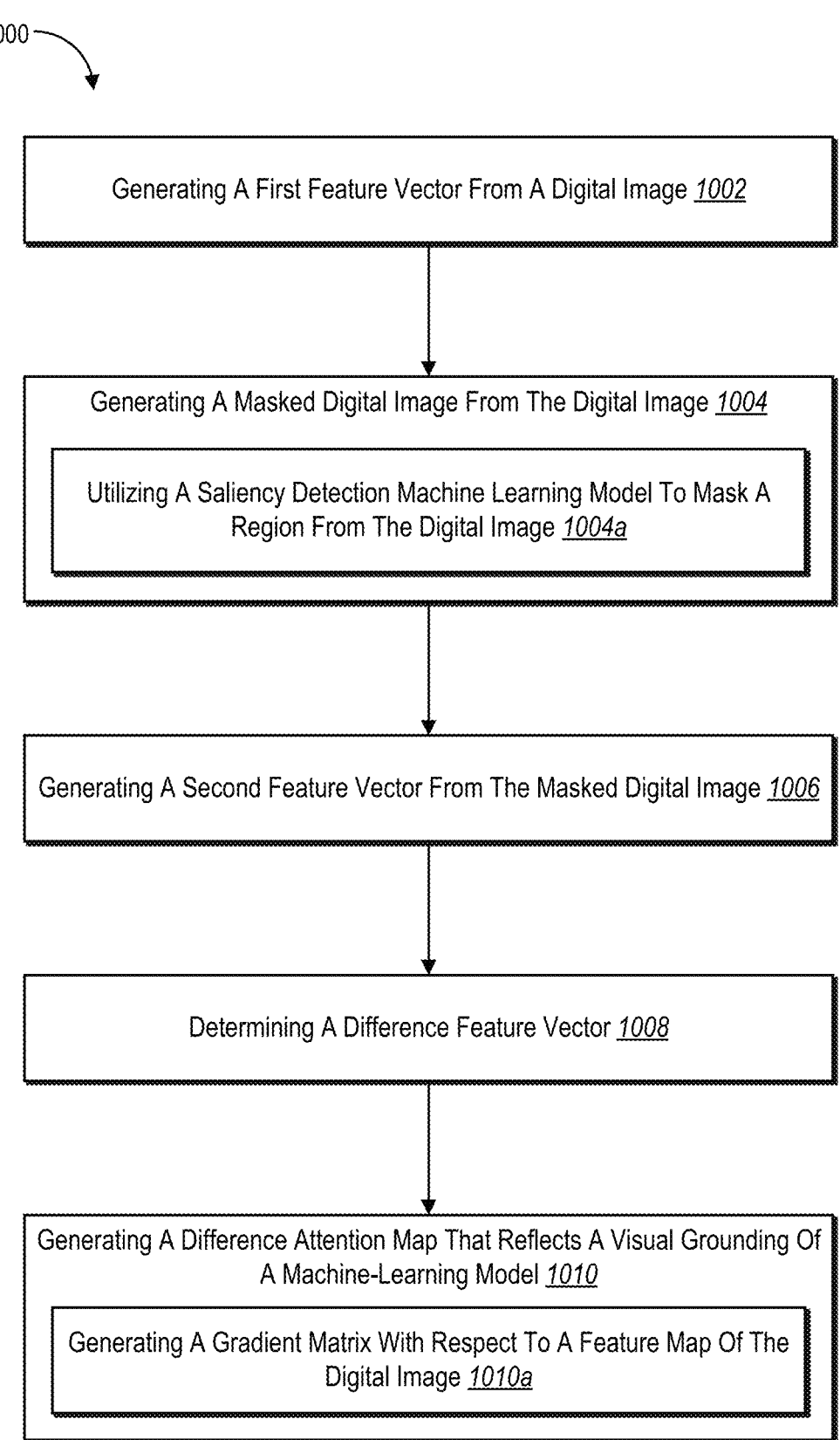

Generating A First Feature Vector From A Digital Image *1002*

Generating A Masked Digital Image From The Digital Image *1004*

Utilizing A Saliency Detection Machine Learning Model To Mask A Region From The Digital Image *1004a*

Generating A Second Feature Vector From The Masked Digital Image *1006*

Determining A Difference Feature Vector *1008*

Generating A Difference Attention Map That Reflects A Visual Grounding Of A Machine-Learning Model *1010*

Generating A Gradient Matrix With Respect To A Feature Map Of The Digital Image *1010a*

*Fig. 10*

VISUAL GROUNDING OF SELF-SUPERVISED REPRESENTATIONS FOR MACHINE LEARNING MODELS UTILIZING DIFFERENCE ATTENTION

BACKGROUND

Recent years have seen developments in hardware and software platforms implementing machine learning models utilizing self-supervised learning (SSL) for scene representations. For example, conventional SSL systems can learn representations for an object portrayed in an image. In particular, conventional SSL systems utilize such representations for downstream tasks such as segmentation. Despite these developments, conventional systems suffer from a number of technical deficiencies, including inaccuracy, inefficiency, and inflexibility of implementing computing devices.

BRIEF SUMMARY

Embodiments of the present disclosure provide benefits and/or solve one or more problems in the art with systems, non-transitory computer-readable media, and methods for utilizing difference attention to enhance the visual grounding of machine learning models. In particular, in one or more implementations, the disclosed systems utilize visual difference attention, which compares an image with its salient-regions-masked-out version to generate visual attention maps in an unsupervised fashion. In one or more embodiments, the disclosed systems utilize visual difference attention as a differentiable operation to generate a difference attention loss to improve visual grounding to salient regions of an image for self-supervised machine learning models.

To illustrate, in some implementations, the disclosed systems obtain a digital image and a masked version of the digital image comprising a mask over a salient region of the digital image. Utilizing a machine learning model, the disclosed systems encode the digital image and the masked digital image into feature vectors. The disclosed systems, compare the feature vectors to determine a difference feature vector, from which the disclosed systems generate a difference attention map. With the difference attention map, the disclosed systems provide an indication of the visual grounding of the machine learning model (e.g., by displaying the difference attention map on a user interface and/or by determining an accuracy metric for the difference attention map). Moreover, in some embodiments, the disclosed systems train the machine learning model utilizing the difference attention map. For instance, the disclosed systems tune parameters of the machine learning model based on a comparison of the difference attention map with a saliency map for the digital image.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 10 illustrates a flowchart of a series of acts for generating a difference attention map in accordance with one or more embodiments.

DETAILED DESCRIPTION

Figure 1:
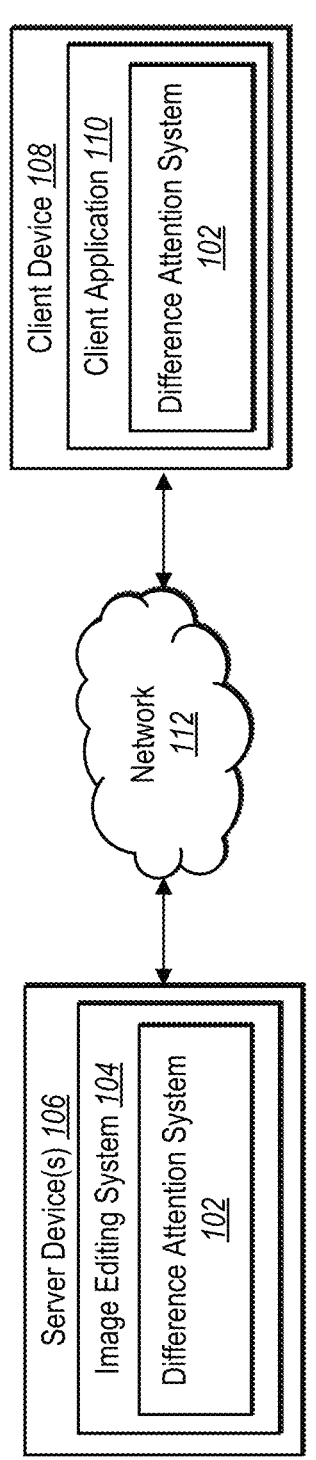
FIG. 1 illustrates a diagram of an environment in which a difference attention system operates in accordance with one or more embodiments.

This disclosure describes one or more embodiments of a difference attention system that utilizes difference attention to enhance the visual grounding of machine learning models. In particular, in one or more embodiments the difference attention system utilizes visual difference attention to qualitatively inspect the quality of representations learned by self-supervised learning (SSL) models with attention maps computed in an unsupervised fashion on an input image. By masking out salient regions and computing a difference map between the original image and the masked out image, in some implementations the difference attention system determines (and/or indicates) how well an SSL model has learned these regions. Moreover, in one or more embodiment, the difference attention system also casts visual difference attention as a differentiable operation that relies on activations produced by intermediate layers of a neural network backbone. Thus, the difference attention system can utilize a new learning objective based on differentiable difference attention loss. In particular, in some implementations the difference attention system computes the model importance for salient image regions directly and trains models with the differentiable difference attention loss to align attention maps to salient regions.

To illustrate, in some implementations, the difference attention system obtains a digital image and obtains or generates a masked version of the digital image with a salient region (or salient regions) masked out. Utilizing an SSL machine learning model, the difference attention system encodes the digital image and the masked digital image into feature vectors. From the feature vectors, the difference attention system determines a difference feature vector. The difference attention system utilizes the difference feature vector to generate a difference attention map and provides the difference attention map as a visual indication of the grounding of the machine learning model relative to the masked out region(s). In some implementations, the difference attention system trains the machine learning model utilizing the difference attention map. For instance, the difference attention system compares the difference attention map with a saliency map for the digital image to determine a difference attention loss, and tunes parameters of the machine learning model utilizing the difference attention loss.

As just mentioned, in some implementations, the difference attention system utilizes visual difference attention by generating difference attention maps that highlight regions in an image on which an SSL machine learning model focuses attention. For example, the difference attention system generates a difference attention map based on differences in feature space between a digital image and a masked version of the digital image. In some embodiments, the difference attention system provides the difference attention map for display via a graphical user interface as a qualitative indication of where in the image (i.e., on which regions of the image) the machine learning model is focusing.

In addition, in some embodiments, the difference attention system generates the difference attention maps utilizing a fully differentiable operation and employs a novel learning objective called differentiable difference attention loss. To illustrate, the difference attention system utilizes the differentiable operation to preserve continuity in a scalar signal of the difference feature vector. Furthermore, the differentiable operation highlights feature dimensions that correspond with salient regions in the image, thereby producing a difference attention map that reflects those salient regions.

Moreover, in some implementations, the difference attention system determines a quantitative accuracy metric for the visual difference attention and the differentiable difference attention loss. In particular, the difference attention system has demonstrated accuracy improvements over prior systems for various downstream tasks, including instance segmentation, object detection, and image classification.

Although conventional systems can generate representations of a single salient object in an image, such systems have a number of problems in relation to accuracy and flexibility of operation. For instance, conventional systems inaccurately identify salient regions of an image. Specifically, for images containing multiple salient objects and/or complex salient objects, conventional systems often focus on peripheral regions of the image outside of the salient regions. Due at least in part to this poor visual grounding on salient objects, conventional systems suffer from inaccuracy with downstream tasks such as object detection and instance segmentation.

Additionally, conventional systems are often inflexible and inefficient. In particular, due at least in part to their inaccurate visual grounding on salient portions of images, conventional systems often require training with annotated datasets. The use of annotated datasets can be computationally costly, requiring extensive memory, storage, and bandwidth resources. For example, some conventional systems use datasets of classification logits, pairs of images from a same class, semantic labels, etc., to train an SSL model.

These datasets often take up large amounts of storage space and memory usage, as well as increase the computational time for processing during training.

Furthermore, conventional systems are also operationally inflexible. Indeed, conventional systems often cannot provide insight into the inner workings of black box machine learning approaches. Thus, during training or implementation, conventional systems often require computationally extensive testing to determine output/performance metrics but fail to provide any indication of the inner functionality or processes within the black box machine learning architecture. Thus, conventional systems fail to provide the operational insight and flexibility into the internal mechanisms of machine learning architectures.

The difference attention system disclosed herein provides a variety of technical advantages relative to conventional systems. For example, by utilizing difference attention, the difference attention system can improve accuracy of model representations relative to conventional systems. Specifically, in some implementations, the difference attention system improves upon prior methods of self-supervised machine-learning models in terms of accuracy by improving the visual grounding of machine learning models. In particular, the difference attention system can enhance the attentiveness of machine learning model for images with multiple salient objects (e.g., multiple instances of objects of a class and/or multiple objects of multiple classes).

In addition, the difference attention system can provide increased flexibility and efficiency in training a machine learning model (e.g., by not requiring annotations in the training dataset). For example, in one or more embodiments the difference attention system utilizes a saliency detection machine learning model to mask salient regions of digital images and employs differentiable difference attention to provide a training objective, all without a need for an annotated dataset.

Moreover, in one or more embodiments, the difference attention system improves operational flexibility by providing improved insight into black box machine learning models. For example, in one or more embodiments, the difference attention system provides improved illustration of how the internal operations of SSL models analyze or focus on an image. Without requiring extensive testing to determine performance parameters, the difference attention system can measure and illustrate the internal attentiveness of a black box machine learning model relative to different regions of input digital images. Thus, the difference attention system can provide valuable insight into the internal mechanisms of machine learning model operation.

Additional detail will now be provided in relation to illustrative figures portraying example embodiments and implementations of a difference attention system. For example, FIG. 1 illustrates a system 100 (or environment) in which a difference attention system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes an image editing system 104 that further includes the difference attention system 102. In some embodiments, the difference attention system 102 generates difference attention maps that reflect a visual grounding of a machine learning model relative to one or more regions of digital images. In some embodiments, the difference attention system 102 trains the machine learning model in a self-supervised fashion to enhance the visual grounding of the machine learning model. In some embodiments, the server device(s) 106 includes, but is not limited to, a computing device (such as explained below with reference to FIG. 11).

In some instances, the difference attention system 102 receives a request (e.g., from the client device 108) to evaluate and/or train a machine learning model. For example, the difference attention system 102 generates one or more difference attention maps based on outputs of the machine learning model. Some embodiments of server device(s) 106 perform a variety of functions via the image editing system 104 on the server device(s) 106. To illustrate, the server device(s) 106 (through the difference attention system 102 on the image editing system 104) performs functions such as, but not limited to, obtaining a digital image, obtaining or generating a masked digital image, generating feature vectors for the digital image and the masked digital image, generating a difference attention map, determining a difference attention loss, and/or modifying parameters of the machine learning model. In some embodiments, the server device(s) 106 utilizes the machine learning model to generate the feature vectors. In some embodiments, the server device(s) 106 trains the machine learning model as described herein.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 11. Some embodiments of client device 108 perform a variety of functions via a client application 110 on client device 108. For example, the client device 108 (through the client application 110) performs functions such as, but not limited to, obtaining a digital image, obtaining or generating a masked digital image, generating feature vectors for the digital image and the masked digital image, generating a difference attention map, determining a difference attention loss, and/or modifying parameters of the machine learning model. In some embodiments, the client device 108 utilizes the machine learning model to generate the feature vectors. In some embodiments, the client device 108 trains the machine learning model as described herein.

To access the functionalities of the difference attention system 102 (as described above and in greater detail below), in one or more embodiments, a user interacts with the client application 110 on the client device 108. For example, the client application 110 includes one or more software applications (e.g., to interact with digital images in accordance with one or more embodiments described herein) installed on the client device 108, such as an image editing application. In certain instances, the client application 110 is hosted on the server device(s) 106. Additionally, when hosted on the server device(s) 106, the client application 110 is accessed by the client device 108 through a web browser and/or another online interfacing platform and/or tool.

As illustrated in FIG. 1, in some embodiments, the difference attention system 102 is hosted by the client application 110 on the client device 108 (e.g., additionally or alternatively to being hosted by the image editing system 104 on the server device(s) 106). For example, the difference attention system 102 performs the difference attention techniques described herein on the client device 108. In some implementations, the difference attention system 102 utilizes the server device(s) 106 to train and implement machine learning models. In one or more embodiments, the difference attention system 102 utilizes the server device(s) 106 to train machine learning models and utilizes the client device 108 to implement or apply the machine learning models.

Further, although FIG. 1 illustrates the difference attention system 102 being implemented by a particular component and/or device within the system 100 (e.g., the server device(s) 106 and/or the client device 108), in some embodiments the difference attention system 102 is implemented, in whole or in part, by other computing devices and/or components in the system 100. For instance, in some embodiments, the difference attention system 102 is implemented on another client device. More specifically, in one or more embodiments, the description of (and acts performed by) the difference attention system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., files of digital images). In response, the difference attention system 102 on the server device(s) 106 performs operations described herein to generate feature vectors and difference attention maps. The server device(s) 106 provides the output or results of the operations (e.g., one or more difference attention maps) to the client device 108. As another example, in some implementations, the difference attention system 102 on the client device 108 performs operations described herein to generate feature vectors and difference attention maps. The client device 108 provides the output or results of the operations (e.g., one or more difference attention maps) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 11. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As discussed above, in some embodiments, the difference attention system 102 generates a difference attention map reflecting a visual grounding of a machine learning model relative to a region of a digital image. For instance, FIG. 2 illustrates the difference attention system 102 generating a difference attention map in accordance with one or more embodiments.

Figure 2:
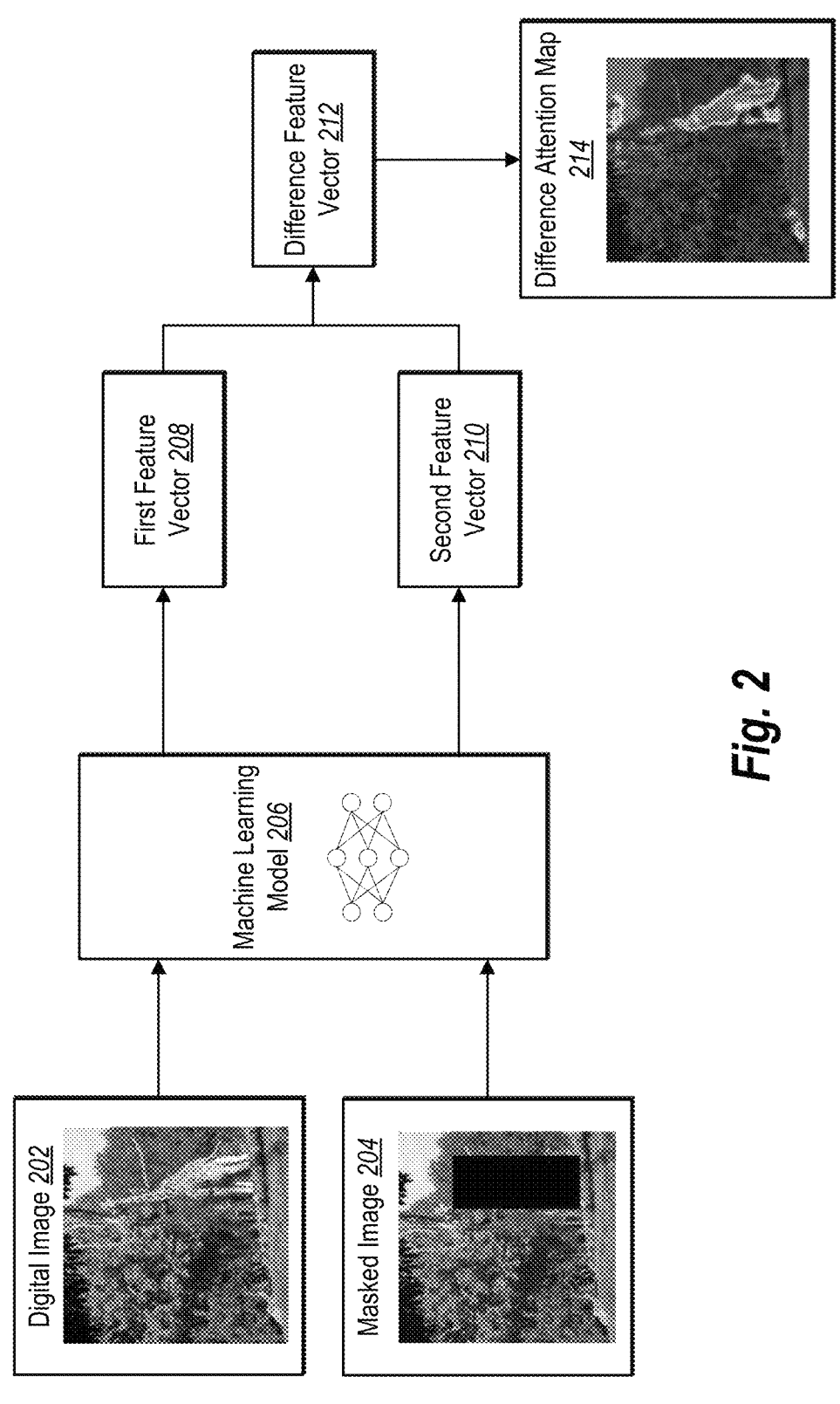
FIG. 2 illustrates the difference attention system generating a difference attention map in accordance with one or more embodiments.

Specifically, FIG. 2 shows the difference attention system 102 receiving a digital image 202 and a masked digital image 204. In some embodiments, the difference attention system 102 generates the masked digital image 204 from the digital image 202 by masking a region of the digital image 202. In some embodiments, the difference attention system 102 receives the masked digital image 204 comprising a portion of the digital image 202 and a mask in place of another portion of the digital image 202.

As mentioned, in some implementations, the difference attention system 102 processes the digital image 202 and the masked digital image 204 through a machine learning model 206. The machine learning model 206 can be one (or more) of a variety of machine learning models. For instance, in some implementations, the machine learning model 206 is a classification machine learning model. Moreover, in some cases, the machine learning model 206 is an object detection machine learning model. Furthermore, in some embodiments, the machine learning model 206 is a segmentation machine learning model.

A machine learning model includes a computer representation that is tunable (e.g., trained) based on inputs to approximate unknown functions used for generating corresponding outputs. In particular, a machine learning model can include a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, or a combination thereof.

Similarly, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, in some cases, a neural network includes a deep neural network, a convolutional neural network, a recurrent neural network (e.g., an LSTM), a graph neural network, or a generative adversarial neural network.

Utilizing the machine learning model 206, in some implementations, the difference attention system 102 generates feature vectors from the digital images. For instance, the difference attention system 102 utilizes the machine learning model 206 to generate a first feature vector 208 from the digital image 202. Additionally, in some implementations, the difference attention system 102 utilizes the machine learning model 206 to generate a second feature vector 210 from the masked digital image 204. A feature vector includes a numerical representation of features of an image (e.g., features and/or pixels of a digital image). For instance, in some cases, a feature vector includes a feature map or an encoded feature representation of a digital image. To illustrate, a feature vector includes a latent feature representation of a digital image generated by one or more layers of a neural network.

In some embodiments, the difference attention system 102 determines a difference feature vector. To illustrate, the difference attention system 102 determines a difference feature vector 212 between the first feature vector 208 and the second feature vector 210 (e.g., by comparing the first feature vector 208 and the second feature vector 210). For example, the difference attention system 102 subtracts the second feature vector 210 from the first feature vector 208 to determine the difference feature vector 212. A difference feature vector includes a vector representing a comparison between two feature vectors. For example, in some cases, a difference feature vector includes a numerical representation (e.g., a latent feature representation) of features of a portion of a first image that is masked out of a second image.

As mentioned, in some implementations, the difference attention system 102 generates a difference attention map. In particular, in some embodiments, the difference attention system 102 utilizes the difference feature vector 212 to generate a difference attention map 214. For instance, and as described in further detail below, the difference attention system 102 generates the difference attention map 214 from the difference feature vector 212 by generating a scalar signal from the difference feature vector 212 and constructing the difference attention map 214 utilizing the scalar signal. A difference attention map includes a map depicting regions in an image of focus (e.g., attention) by a machine learning model. In particular, a difference attention map includes an attention map generated based on differences in feature space between an image and a masked version of the image.

In some embodiments, the difference attention system 102 utilizes the difference attention map 214 to provide quantitative and/or qualitative information reflecting an accuracy of the machine learning model 206. For example, in some implementations, the difference attention system 102 provides the difference attention map 214 for display via a graphical user interface of a client device (e.g., client device 108) as an indication of a visual grounding of the machine learning model 206 relative a region of the digital image 202 (e.g., the masked region of the masked digital image 204). A visual grounding includes an illustration or a measure of how well a model has learned a region of an image in the representations produced by the model. In particular, in some cases, a visual grounding includes a qualitative or quantitative indication of the model's attentiveness to a particular region. For instance, a visual grounding reflects whether the model is focusing (or has focused) on salient portions of an image.

Additionally, or alternatively, in some implementations, the difference attention system 102 determines an accuracy metric for the difference attention map 214 with respect to a saliency map. In some cases, the accuracy metric indicates an accuracy of the machine learning model 206 for detecting, classifying, and/or segmenting objects in the digital image 202.

As mentioned, in some embodiments, the difference attention system 102 utilizes a masked digital image to generate a difference attention map. For instance, FIG. 3 illustrates the difference attention system 102 generating masked digital images for a variety of source digital images in accordance with one or more embodiments.

Figure 3:
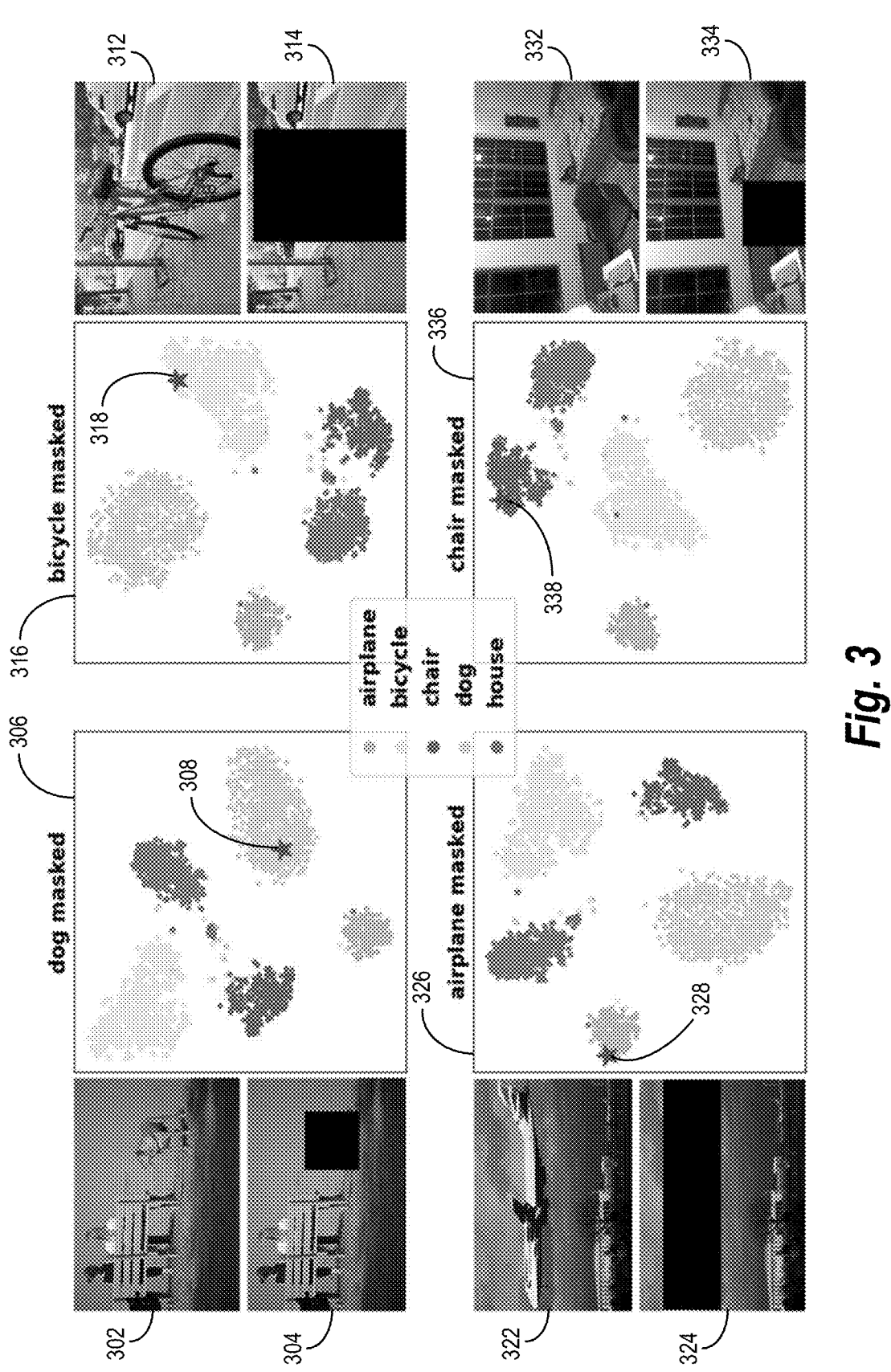
FIG. 3 illustrates the difference attention system generating masked digital images for a variety of source digital images in accordance with one or more embodiments.

For example, FIG. 3 shows the difference attention system 102 obtaining digital images 302, 312, 322, and 332, each depicting a particular scene. Specifically, the digital image 302 depicts a scene with a dog, the digital image 312 depicts a scene with a bicycle, the digital image 322 depicts a scene with an airplane, and the digital image 332 depicts a scene with a chair. As mentioned, in some embodiments, the difference attention system 102 generates masked digital images by masking one or more regions from the digital images 302, 312, 322, and 332. For instance, the difference attention system 102 utilizes a saliency detection machine learning model to identify, respectively, the dog, the bicycle, the airplane, and the chair as salient portions of the digital images 302, 312, 322, and 332. The difference attention system 102 masks these salient portions to generate masked digital images 304, 314, 324, and 334, which each comprise, respectively, a remainder portion of the digital images 302, 312, 322, and 332, and a mask in place of the salient portion of the digital images 302, 312, 322, and 332. For example, in some implementations, the difference attention system 102 utilizes the saliency detection machine learning model to identify a salient region in a digital image, and masks the salient region utilizing a bounding box around the salient region.

A saliency detection machine learning model includes a machine learning model trained to predict which portions of a digital image are salient or relevant (e.g., to an observer). For example, a saliency detection machine learning model includes an unsupervised machine learning model that identifies subjects and/or other relevant objects depicted in an image. For instance, in some embodiments, the difference attention system 102 utilizes a saliency detection machine learning model as described by Duc Tam Nguyen, Maximilian Dax, Chaithanya Kumar Mummadi, Thi Hoai Nhung Ngo, Thi Hoai Phuong Nguyen, Zhongyu Lou, and Thomas Brox, in DeepUSPS: Deep Robust Unsupervised Saliency Prediction with Self-Supervision in *Advances in Neural Information Processing Systems,* 32, 2019, which is incorporated in its entirety herein by reference. The difference attention system 102 can utilize a variety of saliency machine learning model architectures.

As mentioned, in some implementations, the difference attention system 102 generates a first feature vector for a digital image, a second feature vector for a corresponding masked digital image, and a difference feature vector between the first feature and the second feature vector. For instance, the difference attention system 102 generates a first feature vector for the digital image 302 and a second feature vector for the masked digital image 304. Then, the difference attention system 102 determines a difference feature vector between the first feature vector and the second feature vector.

In the case of the digital image 302 (depicting the dog) and its corresponding masked digital image 304 (depicting the same scene, but with the dog masked out), the difference feature vector represents (e.g., in feature space) features of the dog. In particular, the first feature vector for digital image 302 and the second feature vector for masked digital image 304 share similar features with the exception of the features of the dog. Thus, the difference between these two feature vectors primarily contain features of a dog. Similarly, difference feature vectors between first and second feature vectors for the bicycle, the airplane, and the chair images, respectively, primarily contain features of a bicycle, an airplane, and a chair. These differences are illustrated in t-SNE plots reproduced in FIG. 3.

In particular, FIG. 3 illustrates t-SNE plots 306, 316, 326, and 336, each of which includes data points based on approximately 400 baseline images from a random collection of five classes: airplane, bicycle, chair, dog, and house. The difference attention system 102 generates the data points in these t-SNE plots from feature vectors of the baseline images. In addition, the difference attention system 102 generates the masked digital image 304, 314, 324, and 334 from the digital images 302, 312, 322, and 332 (as test images). The difference attention system 102 determined difference feature vectors for these respective test sets and plots the difference feature vectors on the t-SNE plots 306, 316, 326, and 336. To illustrate, the t-SNE plot 306 includes an asterisk 308 that represents the difference feature vector for the test set with the dog (the digital image 302 and the masked digital image 304). As shown in FIG. 3, the asterisk 308 is grouped with the cluster of feature vectors for the baseline images that are in the class of dogs.

Similarly, as shown in FIG. 3, the t-SNE plot 316 includes an asterisk 318 that represents the difference feature vector for the test set with the bicycle (the digital image 312 and the masked digital image 314). The asterisk 318 is grouped with the cluster of feature vectors for the baseline images that are in the class of bicycles. Moreover, the t-SNE plot 326 includes an asterisk 328 that represents the difference feature vector for the test set with the airplane (the digital image 322 and the masked digital image 324). The asterisk 328 is grouped with the cluster of feature vectors for the baseline images that are in the class of airplanes. Furthermore, the t-SNE plot 336 includes an asterisk 338 that represents the difference feature vector for the test set with the chair (the digital image 332 and the masked digital image 334). The asterisk 338 is grouped with the cluster of feature vectors for the baseline images that are in the class of chairs.

As illustrated in FIG. 3, in some cases, the difference attention system 102 highlights, in feature space, salient regions of a digital image by masking the salient region from the digital image (to generate a masked digital image) and determining a difference vector from the original digital image and the masked digital image. As described in additional detail below, in some implementations, the difference attention system 102 utilizes such highlighting of salient regions to train machine learning models to ground their attention on salient aspects of digital images.

As discussed above, in some embodiments, the difference attention system 102 generates difference attention maps and trains machine learning models utilizing the difference attention maps. For instance, FIG. 4 illustrates the difference attention system 102 generating a difference attention map and comparing the difference attention map with a saliency map to train a machine learning model, in accordance with one or more embodiments.

Figure 4:
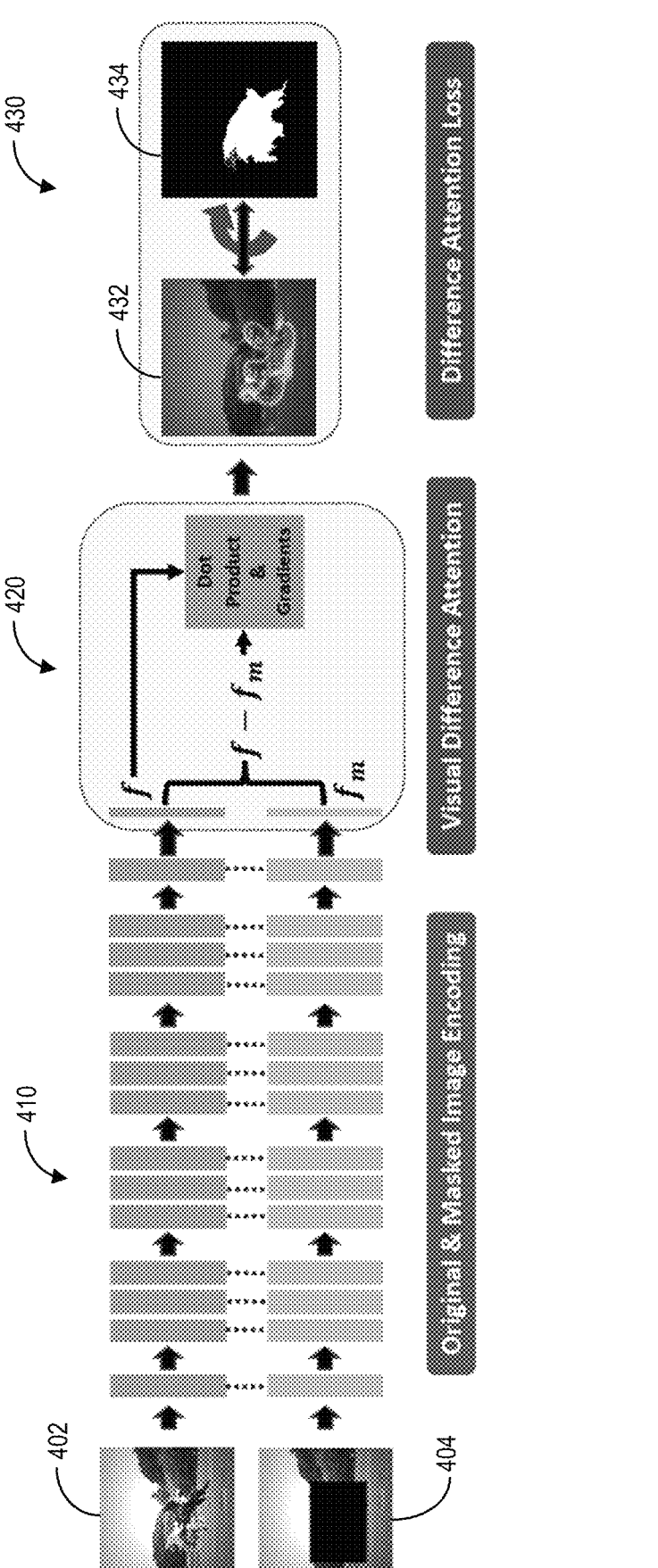
FIG. 4 illustrates the difference attention system generating a difference attention map and comparing the difference attention map with a saliency map in accordance with one or more embodiments.

In particular, FIG. 4 shows the difference attention system 102 obtaining a digital image 402 and a masked digital image 404. In some embodiments, the difference attention system 102 generates the masked digital image 404 from the digital image 402, as described above. The masked digital image 404 comprises a portion of the digital image 402 and a mask in place of another portion (e.g., a salient region) of the digital image 402.

As illustrated in FIG. 4, the difference attention system 102 encodes the digital image 402 and the masked digital image 404 to generate, respectively, a first feature vector f (i.e., a feature vector of the digital image) and a second feature vector $f_m$ (i.e., a feature vector of the masked digital image). In particular, the difference attention system 102 processes the digital image 402 and the masked digital image 404 through encoder layers 410 of a machine learning model (e.g., the machine learning model 206). In some implementations, the encoder layers 410 comprise a fully connected unit. The difference attention system 102 stores the outputs of the fully connected unit as the first and second feature vectors f and $f_m$. In some implementations, the difference attention system 102 generates the first and second feature vectors in a k-dimensional vector space: $f \in \mathbb{R}^k$ and $f_m \in \mathbb{R}^k$.

As discussed, in some implementations, the difference attention system 102 utilizes visual difference attention. To illustrate, FIG. 4 shows a visual difference attention operation 420. In some embodiments, the difference attention system 102 determines a difference feature vector $f_d$ between the first feature vector and the second feature vector. For instance, the difference attention system 102 determines the difference feature vector by subtracting the second feature vector from the first feature vector: $f_d = f - f_m$. In some cases, the difference feature vector contains certain dimensions that contribute most to detecting model behavior (e.g., whether the machine learning model is visually grounded relative to the masked region of the masked digital image 404). As explained next, by identifying those dimensions, the difference attention system 102 can detect the visual grounding of the machine learning model and represent the visual grounding in a difference attention map.

As mentioned, in some embodiments, the difference attention system 102 detects dimensions of the difference feature vector that contribute (e.g., more than a threshold amount) to determining model behavior. For example, in some implementations, the difference attention system 102 generates a projected difference feature vector $\bar{f}_d$, which retains elements in those dimensions of the difference feature vector $f_d$ that contribute most to detecting model behavior, and which contains zero values elsewhere. In some embodiments, the difference attention system 102 performs a thresholding operation on the difference feature vector to generate the projected difference feature vector. For example, the difference attention system 102 utilizes a predetermined threshold value to retain elements of the difference feature vector that are greater than the predetermined threshold value, and to zero out the elements of the difference feature vector that are less than the predetermined threshold value.

Utilizing the projected difference feature vector, in some embodiments, the difference attention system 102 determines a scalar signal s that can be used to generate a difference attention map. In particular, in some embodiments, the difference attention system 102 determines the scalar signal by summing the elements of the projected difference feature vector. For example, the difference attention system 102 determines the scalar signal by computing the dot product of the projected difference feature vector with a vector of ones: $s = 1^T \bar{f}_d$, where $1 \in \mathbb{R}^k$.

As mentioned, in some implementations, the difference attention system 102 utilizes the scalar signal s to generate a difference attention map. To illustrate, the difference attention system 102 generates a gradient matrix (or a set of gradient matrices) based on the scalar signal with respect to a feature map (or a set of feature maps) of the digital image 402. A feature map includes an activation map provided by a convolutional layer of an encoder of the machine learning model. For example, a feature map includes a map or an image output by the various encoder layers 410. In some implementations, the difference attention system 102 generates a gradient matrix with respect to each feature map from the encoder layers 410. To illustrate symbolically, in some implementations, the difference attention system 102 generates n gradient matrices G as follows:

$$G_i = \frac{\partial s}{\partial A_i},$$

i=1, . . . , n, where s is the scalar signal determined by the difference attention system 102, $A_i$ is a feature map from the ith convolutional layer, and n is the total number of feature maps from the convolutional layers. In some cases, the various convolution layers produce feature maps having different resolutions. For instance, the difference attention system 102 generates a first gradient matrix with respect to a first feature map having a first resolution, and a second gradient matrix with respect to a second feature map having a second resolution different from the first resolution.

Furthermore, in some implementations, the difference attention system 102 utilizes a pooling operation to calculate weights for generating the difference attention map. For example, for each feature map, the difference attention system 102 pools the corresponding gradient matrix to determine a weight. In some cases, the difference attention system 102 utilizes an average pooling operation (GAP) on each gradient matrix to generate the weights: $\alpha_i = GAP(G_i)$.

Utilizing the weights $\alpha_i$, in some embodiments, the difference attention system 102 determines a feature sum based on the feature maps. For example, the difference attention system 102 sums the products of the feature maps with their corresponding weights. Then, in some implementations, the difference attention system 102 generates the difference attention map from the feature sum. For instance, in some implementations, the difference attention system 102 processes the feature sum through a rectified linear unit to generate the difference attention map. This operation can be represented symbolically as follows:

$$M = ReLU\left(\sum_{i=1}^{n} \alpha_i A_i\right)$$

where M is the difference attention map, $\alpha_i$ are the weights described above, and $A_i$ are the feature maps described above.

As mentioned above, in some embodiments, the difference attention system 102 determines the scalar signal s utilizing a differentiable operation. In some cases, utilizing a differentiable operation to determine the scalar signal enables the difference attention system 102 to train the machine learning model to ground its visual attention on salient regions of an image. To illustrate, in some implementations, the difference attention system 102 determines an inner product of the first feature vector and the difference feature vector (e.g., in contrast with the thresholding operation of the difference feature vector and the summation of the elements of the projected difference feature vector as described above). For example, the difference attention system 102 determines a differentiable scalar signal from the difference feature vector. This operation can be represented symbolically as follows: $s = f^T f_d$, where s is the differentiable scalar signal, f is the first feature vector (e.g., the feature vector from the digital image 402), and $f_d$ is the difference feature vector. In some implementations, the difference attention system 102 generates the difference attention map as described above, but utilizing the differentiable scalar signal s in place of the scalar signal s determined from the thresholding operation.

By utilizing a differentiable operation to determine the differentiable scalar signal, in some implementations, the difference attention system 102 avoids discontinuities in the gradient matrices, while still highlighting the visual attention of the machine learning model. To illustrate, the dot product of the difference feature vector with the first feature vector (e.g., the feature vector of the digital image 402) captures information from feature dimensions corresponding to salient regions in the digital image 402. The difference attention system 102 can capture this information with the dot product because the difference feature vector has large values in dimensions corresponding to the change between the digital image 402 and the masked digital image 404, and multiplying these large values with the first feature vector enhances the corresponding feature dimensions from the first feature vector. In some cases, the resulting signal (i.e., the differentiable scalar signal) has a focus on feature dimensions corresponding to salient regions in the digital image 402.

As further illustrated in FIG. 4, in some implementations, the difference attention system 102 utilizes difference attention loss to train a machine learning model. For example, FIG. 4 shows a difference attention loss operation 430. To illustrate, the difference attention system 102 generates a difference attention map 432 (e.g., by computing the difference attention map M as described above) and obtains a saliency map 434 of the digital image 402. In some cases, the difference attention system 102 generates the saliency map 434 utilizing a saliency detection machine learning model.

A saliency map includes a representation that indicates salient regions of an image. For instance, a saliency map includes a binary matte comprising unity values at pixel locations within the salient regions, and zero values at pixel locations outside of the salient regions. In some implementations, the difference attention system 102 utilizes the saliency detection machine learning model as described by *DeepUSPS: Deep Robust Unsupervised Saliency Prediction with Self-Supervision* (cited above) to generate the saliency map 434.

As mentioned, in some embodiments, the difference attention system 102 compares the difference attention map 432 with the saliency map 434 to train a machine learning model. To illustrate, the difference attention system 102 determines a difference attention loss by comparing the difference attention map 432 and the saliency map 434. In some embodiments, the difference attention system 102 first processes the difference attention map 432 through a sigmoid softening operation before comparing the difference attention map 432 with the saliency map 434. For example, the difference attention system 102 determines a flattened difference attention map $\tilde{M}$ as follows: $\tilde{M}=\sigma(\gamma(M-\beta))$, where $\gamma$ and $\beta$ are scalars, and where $\sigma$ is the sigmoid softening operator.

In some implementations, the difference attention system 102 determines an inner product of the difference attention map 432 and the saliency map 434. Relatedly, in some implementations, the difference attention system 102 determines an inner product of the flattened difference attention map and the saliency map. In particular, in some embodiments, the difference attention system 102 generates difference attention loss as follows:

$$\mathcal{L}_{DiDA} = 1 - \frac{\langle \tilde{M}, S \rangle}{\|\tilde{M}\|\|S\|}$$

where $\tilde{M}$ is the flattened difference attention map, S is the saliency map, and the terms in the denominator are the corresponding Euclidian norms of the flattened difference attention map and the saliency map.

As mentioned, in some implementations, the difference attention system 102 trains a machine learning model based on the difference attention loss. For example, in some embodiments, the difference attention system 102 trains a classification machine learning model, an object detection machine learning model, and/or a segmentation machine learning model based on the difference attention loss. To illustrate, the difference attention system 102 modifies parameters of the machine learning model to reduce the difference attention loss in a subsequent iteration of training. As the flattened difference attention map approaches the saliency map, their normalized inner product approaches unity and the difference attention loss approaches nullity. Thus, as the difference attention system 102 trains the machine learning model, the difference attention loss decreases and the machine learning model more accurately attends to the salient regions of the digital image 402.

As discussed above, in some embodiments, the difference attention system 102 trains a machine learning model to improve visual grounding relative to salient regions of images. For instance, FIG. 5 illustrates the difference attention system 102 training a machine learning model utilizing two different source images in accordance with one or more embodiments.

Figure 5:
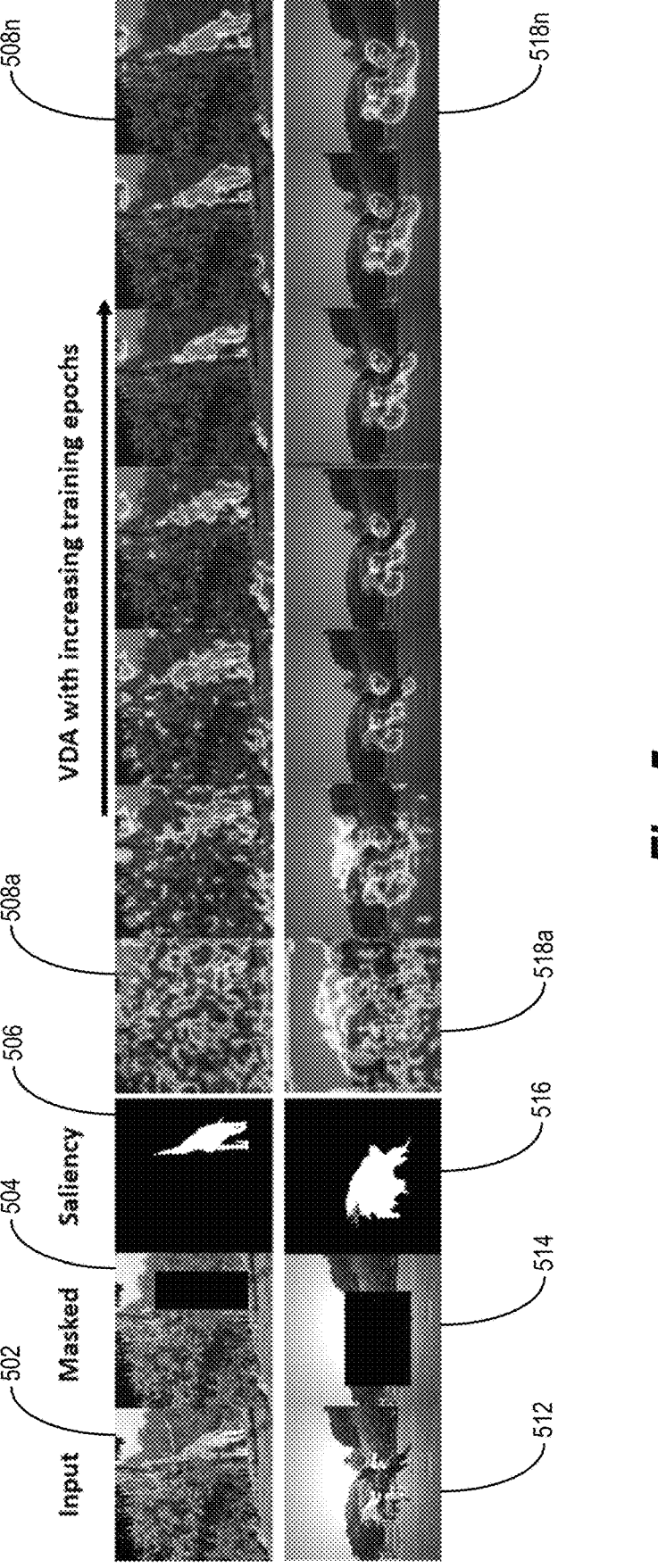
FIG. 5 illustrates the difference attention system training a machine learning model in accordance with one or more embodiments.

Specifically, FIG. 5 shows the difference attention system 102 obtaining a first source image 502 depicting a giraffe, and a second source image 512 depicting an equestrian event. In addition, FIG. 5 shows the difference attention system 102 obtaining a first masked image 504 and a second masked image 514 (corresponding, respectively, to the first source image 502 and the second source image 512). Furthermore, FIG. 5 shows the difference attention system 102 obtaining a first saliency map 506 and a second saliency map 516.

As depicted in FIG. 5, the difference attention system 102 utilizes visual difference attention (and, in particular, differentiable difference attention) as described above to train the machine learning model to attend its visual grounding to the salient portions of the source images (i.e., the giraffe of image 502 and the horses and riders of image 512). Throughout several training epochs, the difference attention system 102 modifies parameters of the machine learning model to effect a change in the visual grounding of the machine learning model. FIG. 5 shows difference attention maps 508a-508n (corresponding to source image 502), and difference attention maps 518a-518n (corresponding to source image 512). These difference attention maps 508a-508n and 518a-518n provide a qualitative view of the improvement of the visual grounding of the machine learning model. Specifically, as the training progresses through the epochs, the localization of the machine learning model's attention improves relative to the salient regions of the images.

Figure 6:
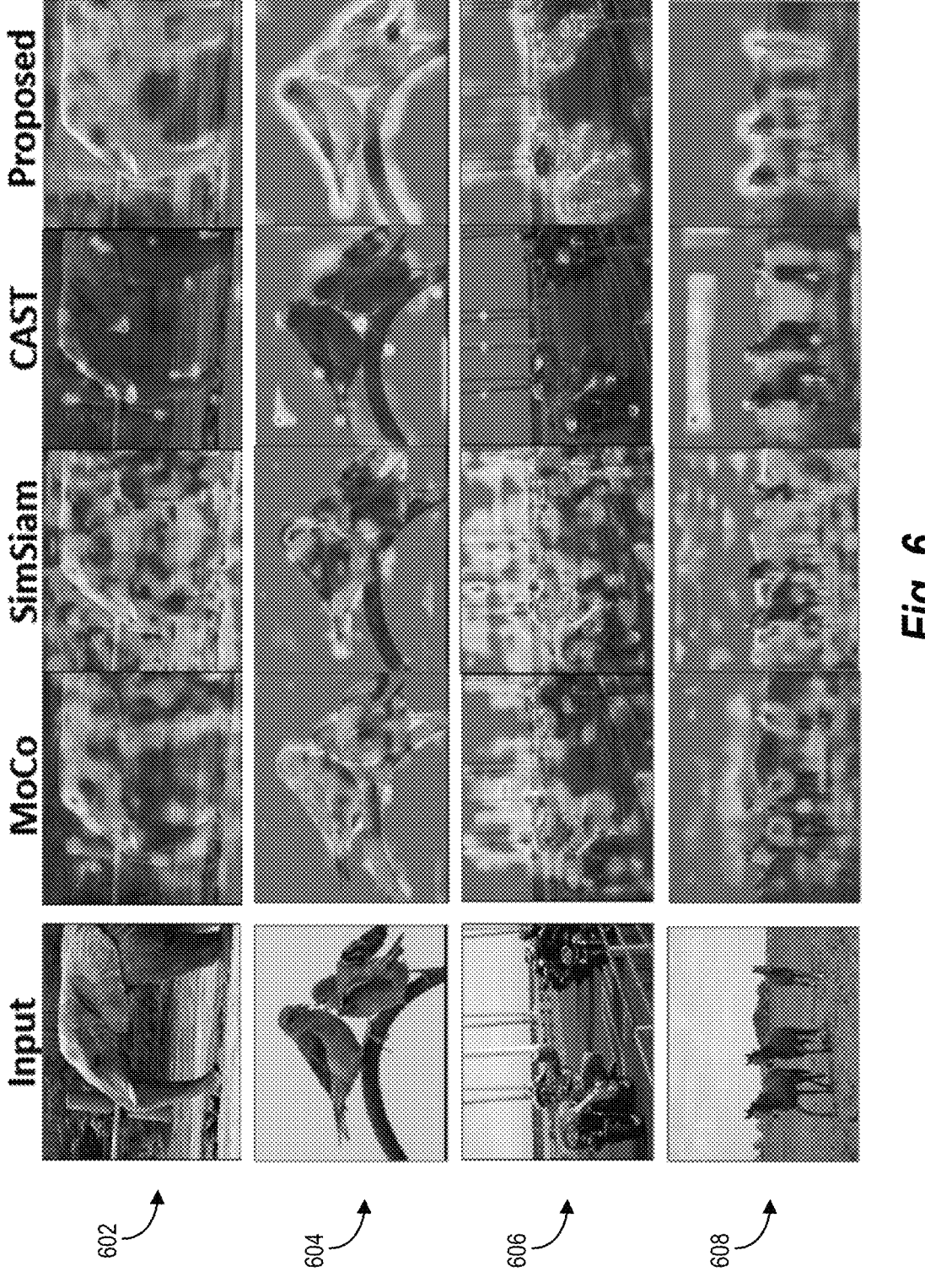
FIG. 6 illustrates output attention maps of conventional systems, as well as output difference attention maps of the difference attention system in accordance with one or more embodiments.

As discussed above, in some embodiments, the difference attention system 102 improves the visual grounding of a machine learning model relative to conventional systems. For instance, FIG. 6 illustrates outputs of the difference attention system 102 (e.g., difference attention maps for various source images) in accordance with one or more embodiments. Additionally, FIG. 6 shows a contrast between the difference attention maps of the difference attention system 102 and output attention maps generated by conventional systems.

Specifically, FIG. 6 shows four example test cases 602, 604, 606, and 608. The left column of FIG. 6 depicts a source image for each test case. The right column of FIG. 6 depicts a difference attention map as generated by the difference attention system 102 ("Proposed") for each test case. The middle columns 2, 3, and 4 of FIG. 6 depict attention maps outputted by three conventional systems.

In particular, column 2 depicts outputs of a momentum contrastive learning system "MoCo" as described by Kaiming He, Haoqi Fan, Yuxin Wu, Saining Xie, and Ross Girshick in Momentum contrast for unsupervised visual representation learning, in *Proceedings of the IEEE/CVF conference on computer vision and pattern recognition,* pages 9729-9738, 2020. Additionally, column 3 depicts outputs of a simple contrastive learning system "SimSiam" as described by Ting Chen, Simon Kornblith, Mohammad Norouzi, and Geoffrey Hinton, in A simple framework for contrastive learning of visual representations, in *International conference on machine learning*, pages 1597-1607. PMLR, 2020. Moreover, column 4 depicts outputs of a contrastive attention supervised tuning system "CAST" as described by Ramprasaath R Selvaraju, Karan Desai, Justin Johnson, and Nikhil Naik in Casting your model: Learning to localize improves self-supervised representations, in *Proceedings of the IEEE/CVF Conference on Computer Vision and Pattern Recognition*, pages 11058-11067, 2021.

In FIG. 6 (as well as the other figures), a high value in an attention map indicates that the particular model gives a high degree of attention at that location of the image, while a low value in the attention map indicates that the model gives a low degree of attention at that location in the image. High values are represented in the attention maps with warm colors (e.g., red, orange, and yellow), which generally appear in grayscale as relatively bright. Low values are represented in the attention maps with cool colors (e.g., green, blue, and purple), which generally appear in grayscale as relatively dark.

As FIG. 6 demonstrates, the difference attention system 102 has, for each test case, superior visual grounding over existing SSL methods. For instance, the attention maps of the conventional SSL systems (in columns 2, 3, and 4) show undesirable visual grounding, as the salient regions of the images are inaccurately highlighted. By contrast, the difference attention maps depicted in the right column ("Proposed") have generally high values over the salient regions and generally low values over the non-salient regions. For example, in test case 602, the difference attention system 102 provides a difference attention map with high values over the elephant and low values elsewhere. The three conventional attention maps of test case 602, however, have more high values outside of the elephant (as compared with the difference attention map on the right) and more low values over the elephant (as compared with the difference attention map on the right).

Similarly, for test cases 604, 606, and 608, the difference attention system 102 provides difference attention maps in the right column of FIG. 6 with better results than the conventional attention maps. In particular, the difference attention maps on the right have generally high values over the birds (test case 604), over the motorcyclists (test case 606), and over the horses (test case 608), and generally low values outside these regions, as compared with the conventional attention maps in columns 2, 3, and 4.

Figure 7:
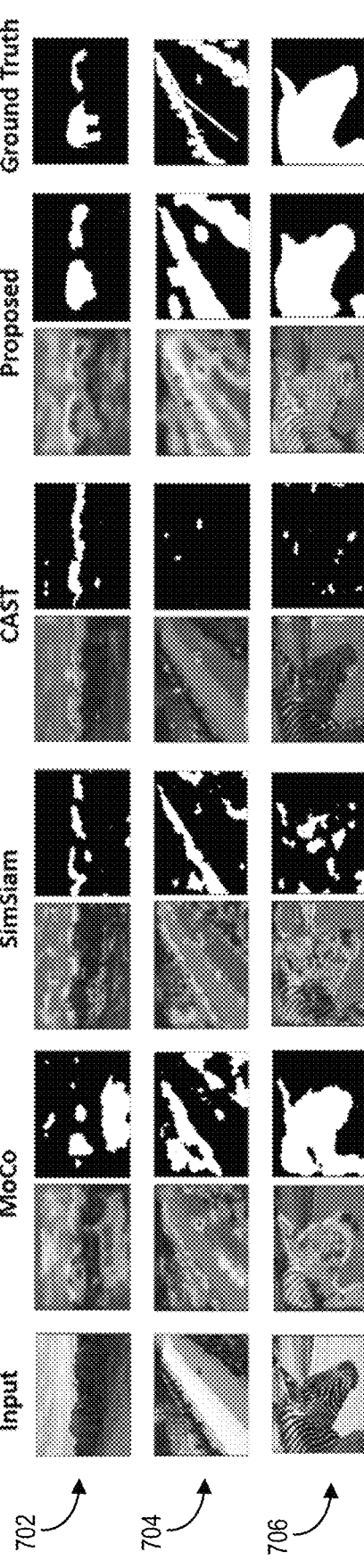
FIG. 7 illustrates output attention maps and segmentation maps of conventional systems, as well as output difference attention maps and segmentation maps of the difference attention system in accordance with one or more embodiments.

As discussed, in some embodiments, the difference attention system 102 provides better priors for downstream tasks, such as instance segmentation, relative to conventional systems. For instance, FIG. 7 illustrates outputs of the difference attention system 102 (e.g., difference attention maps and segmentation maps) in accordance with one or more embodiments. Additionally, FIG. 7 shows a contrast between the difference attention maps and segmentation maps of the difference attention system 102 and output attention maps and segmentation maps generated by conventional systems.

Specifically, FIG. 7 shows three example test cases 702, 704, and 706. The left column of FIG. 7 depicts a source image for each test case. The right column of FIG. 7 depicts ground truth saliency maps for the source images. The middle columns contain pairs of attention maps and segmentation maps of three conventional systems ("MoCo,"

"SimSiam," and "CAST" as cited above) and of the difference attention system 102 ("Proposed").

As FIG. 7 demonstrates, the difference attention system 102 has, for each test case, superior visual grounding over existing SSL methods. For example, the difference attention maps of the difference attention system 102 have generally higher values over salient regions and generally lower values over non-salient regions for each test case, relative to the three conventional systems. For example, in test case 702, the difference attention system 102 provides a difference attention map with high values over the elephants and low values elsewhere. The three conventional attention maps of test case 702, however, have more high values outside of the elephants (as compared with the difference attention map of the difference attention system 102) and more low values over the elephants (as compared with the difference attention map of the difference attention system 102).

Similarly, for test cases 704 and 706, the difference attention system 102 provides difference attention maps with better results than the conventional attention maps. In particular, the difference attention maps of the difference attention system 102 have generally high values over the winter sports event spectators and athlete (test case 704) and over the zebra (test case 706), and generally low values outside these regions, as compared with the conventional attention maps generated by MoCo, SimSiam, and CAST.

Additionally, FIG. 7 illustrates segmentation maps that provide a starting point for a downstream segmentation task. In some embodiments, the difference attention system 102 generates a segmentation map from the difference attention map. In particular, the difference attention system 102 applies a segmentation threshold to binarize the difference attention map into a segmentation map. For instance, the difference attention system 102 applied a segmentation threshold of 0.5 to convert the difference attention maps into segmentation maps. To illustrate, the difference attention system 102 converts pixels with values above 0.5 to have a value of one, and pixels with values below 0.5 to have a value of zero, thereby generating a binary segmentation map. The segmentation maps of the conventional systems shown in FIG. 7 likewise were generated with a segmentation threshold of 0.5.

As with the attention maps, the segmentation maps show substantial improvement by the difference attention system 102 over the conventional systems. For example, as a qualitative view, the segmentation maps of the difference attention system 102 ("Proposed") are more closely aligned with the ground truth saliency maps on the right-hand side of FIG. 7. By contrast, the segmentation maps of the conventional systems ("MoCo," "SimSiam," and "CAST") are generally poorly aligned with the ground truth saliency maps. While the segmentation maps of "MoCo" appear to be the best of the three conventional systems, these segmentation maps are less accurate than the segmentation maps of the difference attention system 102.

Moreover, a quantitative accuracy metric also demonstrates superiority of the difference attention system 102 over the conventional systems. In some embodiments, the difference attention system 102 determines an accuracy metric by comparing a segmentation map with a saliency map. For example, the difference attention system 102 determines an intersection-over-union (IoU) by dividing an intersection with a union of the unity values from the segmentation map and the saliency map. Moreover, the difference attention system 102 determines a mean intersection-over-union (mIoU) by averaging the IoUs across a dataset. As shown in the following table, the difference attention system 102 generates more accurate segmentation maps relative to the conventional methods.

TABLE 1

| Mean intersection-over-union between ground truth saliency masks and output segmentation masks | | | |
|---|---|---|---|
| | MoCo | SimSiam | CAST | Proposed-DiDA |
| mIoU | 0.25 | 0.24 | 0.11 | 0.33 |

As shown in the table, the difference attention system 102 provides outputs with higher intersection-over-union values, thus generating difference attention maps with better visual grounding to salient regions than the attention maps of conventional systems. In this way, the difference attention system 102 provides a better foreground/background starting point for downstream tasks such as instance segmentation, and ultimately resulting in better final segmentation maps.

As discussed above, in some embodiments, the difference attention system 102 provides a difference attention map for display via a graphical user interface of a client device. For instance, FIG. 8 illustrates the difference attention system 102 displaying a difference attention map with a source digital image via a graphical user interface in accordance with one or more embodiments.

Figure 8:
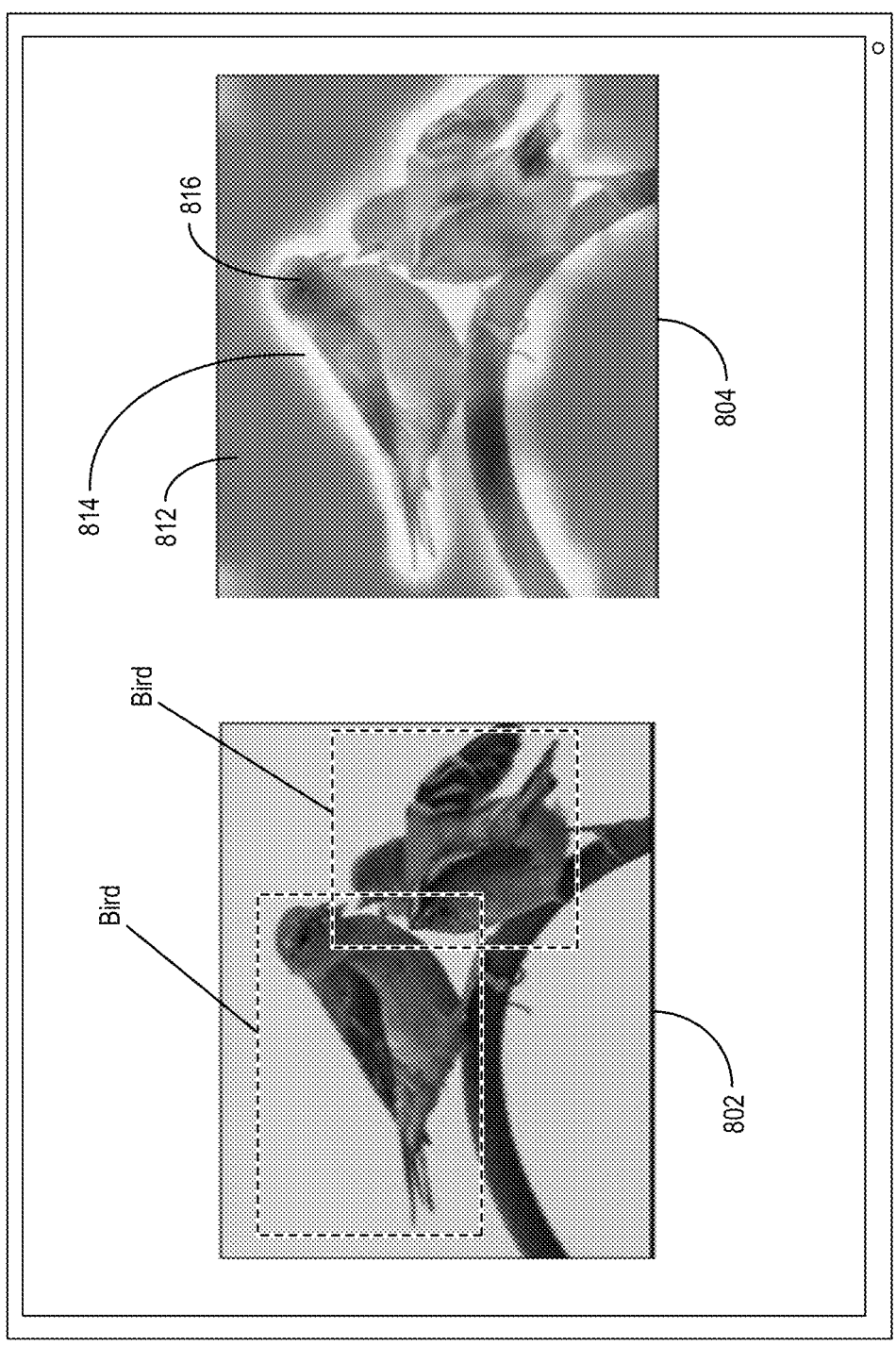
FIG. 8 illustrates the difference attention system displaying a difference attention map via a graphical user interface in accordance with one or more embodiments.

Specifically, FIG. 8 shows a graphical user interface of a client device (e.g., the client device 108). The graphical user interface displays a source image 802 (e.g., of birds) and a difference attention map 804. In some embodiments, the difference attention system 102 provides the difference attention map 804 for display to give a qualitative indication of a machine learning model's visual grounding. For example, in some cases, while a user is training the machine learning model, the difference attention system 102 provides the difference attention map 804 for display to facilitate the training process.

As shown in FIG. 8, the difference attention map 804 includes an indication of the attention of the machine learning model (e.g., as a heat map). For instance, the difference attention map 804 reflects low value regions 812, medium value regions 814, and high value regions 816. Thus, as shown, the difference attention map 804 reflects that the machine learning model is currently giving most attention to the birds, and least attention to the background.

As additionally shown in FIG. 8, the difference attention system 102 can perform downstream tasks, such as object detection. In the graphical user interface, the difference attention system 102 provides detection boxes around the birds, along with identification labels indicating that the objects are birds. Thus, for example, the difference attention system 102 applies an object detection machine learning model to detect birds in the source image 802.

As mentioned, in some implementations, the difference attention system 102 applies and/or trains a machine learning model. In some embodiments, the machine learning model is a classification machine learning model. In some implementations, the machine learning model is an object detection machine learning model. In some embodiments, the machine learning model is a semantic segmentation machine learning model. In some implementations, the machine learning model is an instance segmentation machine learning model.

Figure 9:
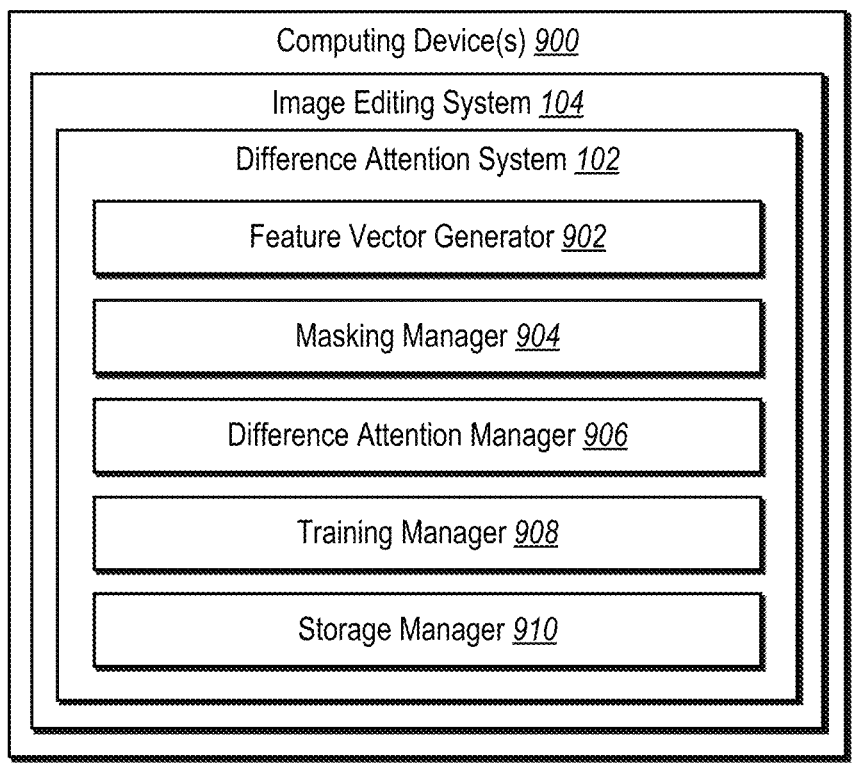
FIG. 9 illustrates a diagram of an example architecture of the difference attention system in accordance with one or more embodiments.

Turning now to FIG. 9, additional detail will be provided regarding components and capabilities of one or more embodiments of the difference attention system 102. In particular, FIG. 9 illustrates an example difference attention system 102 executed by a computing device(s) 900 (e.g., the server device(s) 106 or the client device 108). As shown by the embodiment of FIG. 9, the computing device(s) 900 includes or hosts the image editing system 104 and/or the difference attention system 102. Furthermore, as shown in FIG. 9, the difference attention system 102 includes a feature vector generator 902, a masking manager 904, a difference attention manager 906, a training manager 908, and a storage manager 910.

As shown in FIG. 9, the difference attention system 102 includes a feature vector generator 902. The feature vector generator 902 can generate a feature vector from a digital image and/or a masked digital image. Furthermore, the feature vector generator 902 can determine a difference feature vector between two feature vectors.

In addition, as shown in FIG. 9, the difference attention system 102 includes a masking manager 904. The masking manager 904 can generate a masked digital image by masking one or more regions from a digital image. To illustrate, the masking manager 904 utilizes a saliency detection machine learning model to mask the one or more regions from the digital image.

Moreover, as shown in FIG. 9, the difference attention system 102 includes a difference attention manager 906. The difference attention manager 906 can generate a difference attention map utilizing feature vectors from a digital image and a masked digital image. For example, the difference attention manager 906 determines a scalar signal from a difference feature vector, generates one or more gradient matrices based on the scalar signal, and generates the difference attention map from the one or more gradient matrices.

Furthermore, as shown in FIG. 9, the difference attention system 102 includes a training manager 908. The training manager 908 can train (e.g., modify parameters of) one or more machine learning models, as described above, including a classification machine learning model, an object detection machine learning model, and/or a segmentation machine learning model.

Additionally, as shown in FIG. 9, the difference attention system 102 includes a storage manager 910. The storage manager 910 can store information (e.g., via one or more memory devices) on behalf of the difference attention system 102. For example, the storage manager 910 can include digital images, masked digital images, feature vectors of digital images and/or masked digital images, difference feature vectors, scalar signals, activation maps, gradient matrices, weights, feature sums, difference attention maps, saliency maps and/or difference attention losses.

Each of the components 902-910 of the difference attention system 102 can include software, hardware, or both. For example, the components 902-910 can include one or more instructions stored on a computer-readable storage medium and executable by processors of one or more computing devices, such as a client device or server device. When executed by the one or more processors, the computer-executable instructions of the difference attention system 102 can cause the computing device(s) to perform the methods described herein. Alternatively, the components 902-910 can include hardware, such as a special purpose processing device to perform a certain function or group of functions. Alternatively, the components 902-910 of the difference attention system 102 can include a combination of computer-executable instructions and hardware.

Furthermore, the components 902-910 of the difference attention system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-910 may be implemented as a stand-alone application, such as a desktop or mobile application. Furthermore, the components 902-910 may be implemented as one or more web-based applications hosted on a remote server. The components 902-910 may also be implemented in a suite of mobile device applications or "apps." To illustrate, the components 902-910 may be implemented in an application, including but not limited to Adobe Creative Cloud, Adobe Express, and Adobe Photoshop. The foregoing are either registered trademarks or trademarks of Adobe in the United States and/or other countries.

FIGS. 1-9, the corresponding text, and the examples provide a number of different methods, systems, devices, and non-transitory computer-readable media of the difference attention system 102. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for generating a difference attention map reflecting a visual grounding of a machine learning model in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 of generating a first feature vector from a digital image, an act 1004 of generating a masked digital image from the digital image, an act 1006 of generating a second feature vector from the masked digital image, an act 1008 of determining a difference feature vector, and an act 1010 of generating a difference attention map that reflects a visual grounding of a machine-learning model. Additionally, as shown in FIG. 10, the series of acts 1000 includes an act 1004a of utilizing a saliency detection machine learning model to mask a region from the digital image, and an act 1010a of generating a gradient matrix with respect to a feature map of the digital image.

In particular, the act 1002 can include generating, utilizing a machine-learning model, a first feature vector from a digital image, the act 1004 can include generating a masked digital image by masking a region from the digital image, the act 1006 can include generating, utilizing the machine-learning model, a second feature vector from the masked digital image, the act 1008 can include determining a difference feature vector between the first feature vector and the second feature vector, and the act 1010 can include generating, from the difference feature vector, a difference attention map reflecting a visual grounding of the machine-learning model relative to the region. Moreover, in some embodiments, the act 1008 can include generating, based on the first feature vector and the second feature vector, a gradient matrix with respect to a feature map of the digital image, and the act 1010 can include generating, based on the gradient matrix, a difference attention map that reflects a visual grounding of the machine-learning model relative to the region. Furthermore, in some embodiments, the act 1010 can include generating a difference attention map utilizing the first feature vector and the second feature vector, and the series of acts 1000 can include modifying parameters of the machine-learning model by comparing the difference attention map and a saliency map of the digital image.

In addition, in some embodiments, the series of acts 1000 includes providing the difference attention map for display via a graphical user interface of a client device. Moreover, in one or more implementations, the series of acts 1000 includes providing the difference attention map for display with the digital image via a graphical user interface. In some cases, the series of acts 1000 includes wherein generating the masked digital image comprises utilizing a saliency detection machine learning model to mask the region from the digital image.

Moreover, in some embodiments, the series of acts 1000 includes wherein generating the difference attention map comprises determining a scalar signal from the difference feature vector. In addition, in some implementations, the series of acts 1000 includes wherein generating the difference attention map further comprises generating a gradient matrix based on the scalar signal with respect to a feature map of the digital image. In some cases, the series of acts 1000 includes wherein determining the scalar signal from the difference feature vector comprises performing a thresholding operation on the difference feature vector. Alternatively, or additionally, in some implementations, the series of acts 1000 includes wherein determining the scalar signal from the difference feature vector comprises determining an inner product of the difference feature vector and the first feature vector.

Additionally, in some implementations, the series of acts 1000 includes modifying parameters of the machine-learning model by comparing the difference attention map and a saliency map of the digital image. Furthermore, in some embodiments, the series of acts 1000 includes modifying the parameters of the machine-learning model by: determining a difference attention loss by comparing the difference attention map and the saliency map; and training at least one of a classification machine-learning model, an object detection machine-learning model, or a segmentation machine-learning model based on the difference attention loss. In some cases, the series of acts 1000 includes wherein comparing the difference attention map and the saliency map comprises determining an inner product of the difference attention map and the saliency map.

Moreover, in some embodiments, the series of acts 1000 includes generating the difference attention map by: determining a difference feature vector between the first feature vector and the second feature vector; and determining a differentiable scalar signal from the difference feature vector. In some cases, the series of acts 1000 includes wherein determining the differentiable scalar signal comprises combining the difference feature vector and the first feature vector. In some implementations, the series of acts 1000 includes generating the difference attention map by generating a set of gradient matrices based on the differentiable scalar signal with respect to a set of feature maps of the digital image.

Furthermore, in some implementations, the series of acts 1000 includes wherein generating the gradient matrix with respect to the feature map of the digital image comprises: determining a difference feature vector between the first feature vector and the second feature vector; and differentiating a scalar signal of the difference feature vector with respect to the feature map. Moreover, in some embodiments, the series of acts 1000 includes wherein generating the difference attention map comprises: generating an additional gradient matrix with respect to an additional feature map having a second resolution different from a first resolution of the feature map; and combining the gradient matrix and the additional gradient matrix. Additionally, in some cases, the series of acts 1000 includes wherein combining the gradient matrix and the additional gradient matrix comprises: generating a first weight by pooling the gradient matrix; generating a second weight by pooling the additional gradient matrix; and determining a feature sum by combining the feature map and the additional feature map utilizing the first weight and the second weight. Furthermore, in some embodiments, the series of acts 1000 includes determining a difference attention loss by comparing the difference attention map and a saliency map; and modifying parameters of the machine-learning model based on the difference attention loss.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
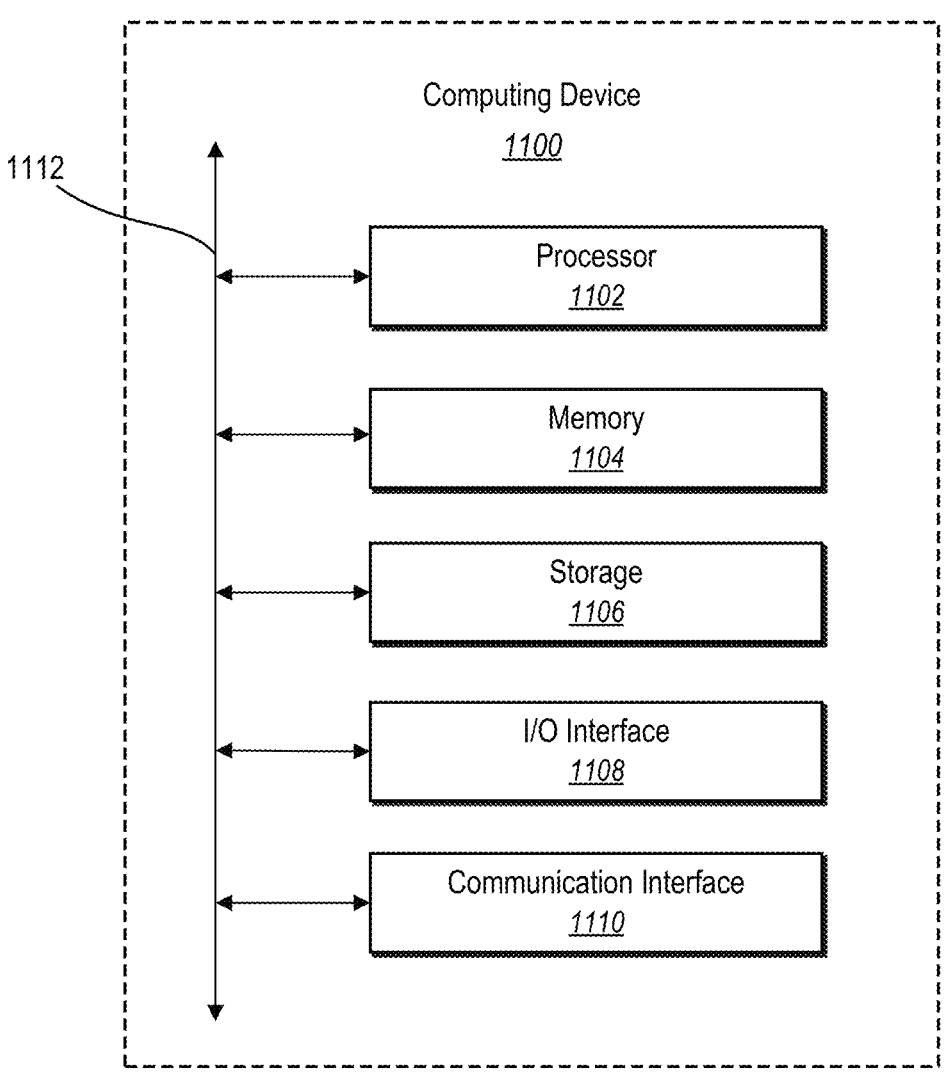
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device(s) 900, the server device(s) 106, or the client device 108). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes the memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes the storage device 1106 for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include the bus 1112. The bus 1112 can include hardware, software, or both that connects components of computing device 1100 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a machine-learning model, an image feature vector from a digital image;
generating a masked digital image by masking a region from the digital image;
generating, utilizing the machine-learning model, a masked image feature vector from the masked digital image;
determining a masked-image-difference feature vector by determining a difference between the image feature vector of the digital image and the masked image feature vector of the masked digital image; and
generating a difference attention map reflecting a visual grounding of the machine-learning model relative to the region by comparing activation maps of layers of the machine-learning model with the masked-image-difference feature vector, generated from the image feature vector of the digital image and the masked image feature vector of the masked digital image.

2. The computer-implemented method of claim 1, further comprising providing the difference attention map for display via a graphical user interface of a client device.

3. The computer-implemented method of claim 1, wherein generating the masked digital image comprises utilizing a saliency detection machine learning model to mask the region from the digital image.

4. The computer-implemented method of claim 1, wherein generating the difference attention map comprises determining a scalar signal from the masked-image-difference feature vector.

5. The computer-implemented method of claim 4, wherein generating the difference attention map further comprises generating a gradient matrix based on the scalar signal with respect to a feature map of the digital image.

6. The computer-implemented method of claim 4, wherein determining the scalar signal from the masked-image-difference feature vector comprises performing a thresholding operation on the masked-image-difference feature vector.

7. The computer-implemented method of claim 4, wherein determining the scalar signal from the masked-image-difference feature vector comprises determining an inner product of the masked-image-difference feature vector and the image feature vector.

8. The computer-implemented method of claim 1, further comprising modifying parameters of the machine-learning model by comparing the difference attention map and a saliency map of the digital image.

9. A system comprising:
one or more memory devices comprising a digital image, a masked digital image comprising a portion of the digital image, and a machine-learning model; and
one or more processors configured to cause the system to:
generate, utilizing the machine-learning model, an image feature vector from the digital image;

generate, utilizing the machine-learning model, a masked image feature vector from the masked digital image;
generate a difference attention map by comparing activation maps of layers of the machine-learning model based on a difference between the image feature vector of the digital image and the masked image feature vector of the masked digital image; and
modify parameters of the machine-learning model by comparing the difference attention map and a saliency map of the digital image.

10. The system of claim 9, wherein the one or more processors are further configured to modify the parameters of the machine-learning model by:
determining a difference attention loss by comparing the difference attention map and the saliency map; and
training at least one of a classification machine-learning model, an object detection machine-learning model, or a segmentation machine-learning model based on the difference attention loss.

11. The system of claim 9, wherein the one or more processors are further configured to generate the difference attention map by:
determining a masked-image-difference feature vector between the image feature vector and the masked image feature vector; and
determining a differentiable scalar signal from the masked-image-difference feature vector.

12. The system of claim 11, wherein determining the differentiable scalar signal comprises combining the masked-image-difference feature vector and the image feature vector.

13. The system of claim 11, wherein the one or more processors are further configured to generate the difference attention map by generating a set of gradient matrices based on the differentiable scalar signal with respect to a set of feature maps of the digital image.

14. The system of claim 9, wherein comparing the difference attention map and the saliency map comprises determining an inner product of the difference attention map and the saliency map.

15. A non-transitory computer-readable medium storing executable instructions that, when executed by a processing device, cause the processing device to perform operations comprising:
generating, utilizing a machine-learning model, an image feature vector from a digital image;
generating a masked digital image by masking a region from the digital image;
generating, utilizing the machine-learning model, a masked image feature vector from the masked digital image;
generating, based on a difference between the image feature vector of the digital image and the masked image feature vector of the masked digital image, a gradient matrix with respect to a feature map of the digital image; and
generating, based on the gradient matrix, a difference attention map that reflects a visual grounding of the machine-learning model relative to the region by comparing activation maps of layers of the machine-learning model with the difference between the image feature vector of the digital image and the masked image feature vector of the masked digital image.

16. The non-transitory computer-readable medium of claim 15, wherein the operations further comprise providing the difference attention map for display with the digital image via a graphical user interface.

17. The non-transitory computer-readable medium of claim 15, wherein generating the gradient matrix with respect to the feature map of the digital image comprises:

determining a masked-image-difference feature vector between the image feature vector and the masked image feature vector; and differentiating a scalar signal of the masked-image-difference feature vector with respect to the feature map.

18. The non-transitory computer-readable medium of claim 15, wherein generating the difference attention map comprises:

generating an additional gradient matrix with respect to an additional feature map having a second resolution different from a first resolution of the feature map; and combining the gradient matrix and the additional gradient matrix.

19. The non-transitory computer-readable medium of claim 18, wherein combining the gradient matrix and the additional gradient matrix comprises:

generating a first weight by pooling the gradient matrix;

generating a second weight by pooling the additional gradient matrix; and determining a feature sum by combining the feature map and the additional feature map utilizing the first weight and the second weight.

20. The non-transitory computer-readable medium of claim 15, wherein the operations further comprise:

determining a difference attention loss by comparing the difference attention map and a saliency map; and modifying parameters of the machine-learning model based on the difference attention loss.

\*   \*   \*   \*   \*